July 2, 1957 W. G. ROWELL 2,797,745
IGNITION CONTROL-AND-MONITORING SYSTEM
Filed Dec. 12, 1952 8 Sheets-Sheet 1

INVENTOR.
WILLIAM G. ROWELL
BY
Rines and Rines
ATTORNEYS

July 2, 1957  W. G. ROWELL  2,797,745
IGNITION CONTROL-AND-MONITORING SYSTEM
Filed Dec. 12, 1952  8 Sheets-Sheet 2

INVENTOR.
WILLIAM G. ROWELL
BY *Rines and Rines*
ATTORNEYS

FIG. 6

INVENTOR.
WILLIAM G. ROWELL
BY Rines and Rines
ATTORNEYS

July 2, 1957  W. G. ROWELL  2,797,745
IGNITION CONTROL-AND-MONITORING SYSTEM
Filed Dec. 12, 1952  8 Sheets-Sheet 5

FIG. 7

INVENTOR
WILLIAM G. ROWELL,

BY Rines and Rines

ATTORNEYS

July 2, 1957 W. G. ROWELL 2,797,745
IGNITION CONTROL-AND-MONITORING SYSTEM
Filed Dec. 12, 1952 8 Sheets-Sheet 6

INVENTOR.
WILLIAM G. ROWELL
BY *Rines and Rines*
ATTORNEYS

FIG. 10

July 2, 1957  W. G. ROWELL  2,797,745
IGNITION CONTROL-AND-MONITORING SYSTEM
Filed Dec. 12, 1952  8 Sheets-Sheet 8

INVENTOR.
WILLIAM G. ROWELL
BY 
ATTORNEYS

United States Patent Office 2,797,745
Patented July 2, 1957

2,797,745

IGNITION CONTROL-AND-MONITORING SYSTEM

William G. Rowell, Quincy, Mass., assignor to Scully Signal Company, Melrose, Mass., a corporation of Massachusetts Application December 12, 1952, Serial No. 325,599

3 Claims. (Cl. 158—28)

The present invention relates to ignition control-and-monitoring systems and more particularly to combination pilot-burner-operating-and-flame-monitoring systems.

Industrial burners generally utilize a gas pilot burner or torch to produce a flame for igniting the fuel of a main burner. From a safety standpoint, and, in some cases, by statutory requirement, methods of actually proving the existence of a proper pilot flame are necessary. If a proper pilot flame does not exist at a region where it will reliably ignite the fuel of the main burner, the main burner fuel-supplying valve should not be permitted to open. If, on the other hand, a proper pilot flame is proven to exist at the desired region by a suitable safety control, the main fuel valve should then be permitted to open in order to establish combustion of the fuel of the main burner. The next step in the sequence of operation of the main burner, insofar as safety controls are concerned, is the proving of the existence of the main flame of the main burner itself. After such proving of the main burner flame takes place, the pilot burner may be turned off, as it is no longer required.

The proving of the existence of the main burner flame is often effected with the aid of an optical scanning system of the photo-electric cell type, connected to amplifier stages having a relatively high input impedance. The photo-electric cell system, however, is not used to prove or detect the presence of the gas pilot flame since the light characteristics of a gas pilot flame can not be reliably monitored by photo-electric cells. The system commonly employed to prove or detect the presence of the gas pilot flame, on the other hand, consists of a flame rod or probe electrode upon which the gas flame may impinge when the pilot burner is in operation. Several types of electrical circuit are variously used in connection with the flame rod or probe electrode, the most common type employing the rectifying characteristics of the flame to actuate an electric-discharge device. Other circuits utilize the electrical conductivity property of the gas flame to actuate an appropriate safety control. In circuits of this character, the pilot burner flame is frequently produced by applying an arcing potential between an igniter electrode and the pilot burner tube through which the ignitible gas mixture is passed. The pilot burner tube is usually maintained at ground potential. A further source of potential, separate from the arcing potential, is usually also provided between the flame rod or probe electrode and the burner tube in order that current may flow in response to this further potential from the tube through the flame to the probe, thereby to produce a signal in an associated indicating or control circuit that proves the existence of the pilot burner flame. To this end, it is essential that the flame be continuously in electrical contact with the grounded pilot burner tube in order to provide the before-described flame-monitoring circuit. This pilot-burner flame-monitoring circuit may, in turn, be connected to the before-mentioned photo-electric cell amplifier stages of relatively high input impedance, so that both the photocell-controlled main-burner flame-proving voltages and the pilot-burner flame-proving voltages are connected in parallel to the amplifier system. Such systems, however, are subject to several disadvantages.

In the first place, operating into such a high-impedance amplifier system, the pilot-burner flame-monitoring circuit can produce but little output current, usually of the order of but a few microamperes. In view of such small available currents, these flame-monitoring systems are often unreliable. When the probe electrode, indeed, has been subjected to the flame of the pilot burner for a period of time, coatings form thereupon, markedly increasing the series resistance in the flame-monitoring circuit and decreasing the ratio of the area of the burner that serves to ground the flame to the area of the probe electrode that intercepts the flame, thus reducing the degree of rectification, as described, for example, commencing with page 568 of "Handbook of Oil Burning," by F. H. Forest and G. T. Kaufman, published by the Oil-Heat Institute of America, 1951. This has the effect of reducing even further the available output current, and may cause failure of the pilot burner flame-monitoring system.

The connecting of the main burner photo-electric cell-controlled flame-monitoring system and the pilot-burner flame-monitoring system to the same amplifier system is attendant with other disadvantages. As pointed out before, a pilot-flame detector must indicate the presence of the pilot flame at a region where it will reliably ignite the main-burner fuel to produce the main-burner flame. This means that the probe electrode or flame rod must be in close proximity to a region where the pilot burner flame intersects the fuel emitted from the main burner gun. It has been found, however, that the main burner flame does not retain a fixed position. Drift and variation of position occur due to variations in the condition of the draft and spinner cup or nozzle of the main burner apparatus. The main burner flame can and often does, indeed, actually impinge upon the probe electrode or flame rod itself, establishing a spurious and undesired path to ground through the main flame, and thus is not providing an indication in the amplifier stages as to whether or not the pilot flame itself is actually still in proper operation. This condition can also cause the photo-electric cell system monitoring the main burner flame to be non-functional to the presence of the main flame. If the light emanating from the main burner flame were blocked from the photo-electric cell, for example, the amplifier stages would still be energized, permitting the main burner to continue to run even though it were operating poorly. If, moreover, the pilot burner gas valve failed to close after the main flame has been established, such an undesired continuation of operation would also be effected.

A further disadvantage of this prior-art construction resides in the fact that the grounded pilot-burner tube through which the ignitible gas mixture is passed is itself used as one of the electrodes of the flame-monitoring circuit. As before stated, the pilot-burner flame must continuously make a relatively low-resistance electrical contact with this tube, in order to complete the monitoring circuit. If the flame pulls or drifts away from parts of the opening of the tube, as in response to changing draft conditions, this electrical connection is broken and the system operates erratically. In order to remedy this situation, it has been proposed to place about the open end of the grounded pilot burner tube a plurality of fingers or fins extending a distance of usually two or three inches into the flame in an attempt continuously to establish reliable low-resistance electrical contact with a substantial area of the flame. Coatings, however, soon become formed upon the fingers or fins themselves and the flame can not, in practice, be satisfactorily grounded.

An additional disadvantage of the before-described constructions is attendant upon the necessary positioning of the probe electrode or flame rod to prevent its shorting against the burner tube or the fingers or fins extending therefrom. It is frequently required that the probe electrode be positioned at a point remote from the opening of the burner tube in order to achieve this result. This inherently means that a probe-electrode supporting arm of considerable length must be used. Under the heat of the flame, the probe electrode becomes thus readily warped about the long supporting arm out of the flame, and flame-monitoring then becomes impossible.

Still another disadvantage of the before-mentioned pilot-flame monitoring systems resides in the inability of such systems to differentiate between ignition of the gas in the pilot burner caused by the intended arcing of the igniter electrode, and the ignition of the gas effected by its striking the hot bricks of the furnace. The igniter system, for example, might be rendered inoperative, and yet the pilot-burner monitoring system would indicate the presence of a hot-brick-ignited gas flame, giving the false indication that the igniter system was properly functioning.

An object of the present invention is to provide a new and improved ignition-control-and-monitoring system that shall not be subject to any of the above-described disadvantages.

A further object is to provide an electrically improved pilot-burner-controlling-and-flame-monitoring system. In summary, the invention, from its broadest aspect, resides in a system for monitoring a flame issuing from the open end of a burner comprising an igniter electrode having one end preferably disposed in the proximity of the open end of the burner and a flame-monitoring electrode one end of which is disposed outside the said open end of the burner in the space occupied by the flame. A source of relatively high voltage is connected to the other ends of the electrodes for producing a spark between the said one end of the igniter electrode and the burner by which to ignite gases in the burner to produce the flame and for producing, also, the flame-monitoring current between the igniter electrode and the flame-monitoring electrode. Preferred circuits and mechanical features are later discussed in detail.

Another object of the invention is to provide an improved electrical arc-producing means for insuring long life of the pilot burner igniter electrode as well as thorough ionization of the flame.

Still another object is to provide an improved mechanical construction for a flame-controlling-and-monitoring apparatus.

An additional object is to provide a novel pilot-burner valve that is particularly adapted for use with the said flame-controlling-and-monitoring system.

Present-day systems of the above-described character, furthermore, are unable to detect faulty operation of the valve supplying fuel to the pilot burner. Tar, gum and other foreign substances in the gas may become deposited upon the valve, causing failure of the valve to close. When this condition takes place, an extremely hazardous situation can develop. If the valve is stuck in an open position, the pilot-flame monitoring circuits in present-day systems will continue to sense the presence of the pilot flame, resulting in a condition where the pilot flame is in operation when it should not be in operation and its monitoring voltages are feeding the amplifier control stages. This condition in itself, while from an economic standpoint is not desirable, is not hazardous. If, however, a loss of combustion in the main burner occurs, the presence of these false monitoring voltages in the amplifier stages will prevent the shutting off of the main burner fuel-supplying valve. This condition can be hazardous. If, for example, the loss of the main burner combustion was due to a temporary or partial loss of the fuel supply to the main burner, fuel can still be admitted in quantities of insufficient amount initially to be ignited by the pilot flame. With the pilot burner valve stuck in a partially closed condition, it is thus possible that, if full fuel supply to the main burner should be resumed, the fuel would fail to ignite. Under such circumstances, continuous, uncontrolled pumping of the unignited fuel into the fire box of the burner would take place with possible disastrous results.

A further object of the invention is to provide a safety control apparatus for a pilot and main burner system that will overcome this danger by rendering the flame-monitoring system unresponsive to the unwanted presence of a pilot flame after a predetermined interval of time.

Another object is to provide a further safety control in accordance with which the main burner fuel supply is cut off in the event of false operation of the pilot burner monitor-circuit supervisory relay.

Other and further objects will be explained hereinafter and will be more particularly ponited out in the appended claims.

The invention will now be described in connection with the accompanying drawing, Fig. 1 of which is a side elevation, partly in section, of a pilot burner constructed in accordance with a preferred embodiment of the present invention.

Referring, first, to Figs. 1 to 4, a pilot burner chamber 1, preferably in the form of a steel tube, is shown provided at one end with a casting containing an inlet 3, through which a gas mixture may be passed, in the direction of the arrow, into the tube 1. Mounted within the tube 1, substantially parallel to its axis, is an igniter electrode 5, the free or left-hand end of which preferably extends through a circular opening 2 in an end plate 29, just outside the mouth of the tube 1. The said end of the igniter electrode 5 is preferably, though as later explained not essentially, of U-shape with the arms of the U terminating near portions of the opening 2 in the end plate 29 in order to provide little restriction to the gas flame formed at the mouth of the tube 1 and, also, to provide a multiplicity of arcing paths, thereby to insure dependable ignition and a high degree of ionization of the gas, consistent with long life for the igniter electrode 5. Disposed, also, within the tube 1 is a flame rod or probe electrode 7 a portion of which extends substantially parallel to the axis of the tube 1 and the free end of which is preferably bent transversely inward toward the igniter electrode 5 in order to project into the space that will be occupied by the flame of the pilot burner. Electrical connection to the flame rod or probe electrode 7 is effected at its right-hand electric terminal 9 by an insulation-covered conductor 11. Electrical connection to the igniter electrode 5 is provided at its right-hand electric terminal 13 by an insulation-covered conductor 15. Electrical connection to the conducting tube 1, itself, may be effected at a terminal 17, Fig. 2, by a conductor 19 whch may, in part, take the form of a conductive sleeve disposed about the conductor 11 and which may terminate upon a conducting plate 26.

The flame-probe electrode 7 and the igniter electrode 5 are shown supported within respective coaxial insulating sleeves 21 and 23, as of porcelain. These sleeves may be constituted of successive tubular sections joined by mica or other insulating washers 25. The sleeve 21 for the flame-probe electrode 7 extends outside the mouth of the burner, fitting closely within a circular aperture or opening 4 in the end plate 29 above the aperture or opening 2, as viewed in Figs. 1 and 3, and connected thereto by a transverse slot 6. The opening 2, on the other hand, is considerably larger than the diameter of the sleeve 23 and accommodates the arms of the transverse U-shaped arc-discharge terminal portion of the igniter electrode 5. The right-hand or inner end portion of the sleeve 21 passes through an opening 10 of larger diameter than the sleeve in the rear wall 14 of the casting containing the inlet 3. It is supported within a porcelain block 8 that, in turn, is held by a clamping plate 32 against an end cover or plate 12 by means of screws 45 threaded into sockets 41 integral with the end plate 12. The end cover or plate 12 is held by screws 27 against the rear wall 14 of the inlet casting 3 with a gasket 16 therebetween, and is readily detachable from the rear wall 14. Projecting in a plane at right angles to the plane of the end plate 12 is the before-mentioned plate 26 provided with an opening 20 through which the electrical conductors 11 and 19 may pass in order to establish respective connection with the terminal 9 of the probe electrode 7 and with the plate 26 that is, of course, electrically connected to the tube 1. The sleeve 23 is similarly supported in the block 8 associated with the end cover 12, but within a closely fitting opening 18 in the rear wall 14 of the inlet casting 3. An end cap 33, held on to the inlet casting 3 as by screws 22, may be employed, and the right-hand end of the sleeve 23 may pass through the rear wall of the cap 33 so that the right-hand terminal 13 of the igniter electrode 5 may make contact with the electrical conductor 15 outside the cap 33. By removing the end cap 33, all of the electrode terminals become exposed so that connection to electric circuits therefrom may be easily effected at this one location.

As a result of this construction, the gas mixture may flow within the inlet 3 into the tube 1 and, because of the tight fit of the sleeve 21 in the opening 4 of the end plate 29 at the mouth of the burner, the gas escapes only through the slot 6 and the opening 2 surrounding the arcing terminal of the electrode 5. The electrode assemblies, furthermore, are easily withdrawn from the tube 1 merely by loosening the screws 27 and pulling outward on the sleeve 23. The inwardly bent transverse terminal portion of the probe electrode 7 will be withdrawn through the opening 4 and the transverse slot 6 in the end plate 29, and the arcing electrode 5 similarly will be withdrawn through the opening 2. The arcing electrode may pass through the opening 18 in the rear wall 14 of the inlet casting 3 and the tip of the probe 7 will pass through the opening 10 and a neck 24 connecting the openings 10 and 18 in the rear wall 14. Thus, as contrasted with prior-art pilot burners that require at least two holes in the boiler wall for respectively inserting the burner itself and the probe electrode, and that, as before described, are subject to difficulties attendant upon the warping of the long probe electrode structure and its adjustment into proper position, the mechanical construction of the present invention requires but a single hole 28 in the boiler wall 30, Figs. 1 and 6, and not only provides rigidity for the probe electrode, but permits the easy external withdrawal or insertion of the same, as well as of the igniter electrode, while the burner 1 remains fixed in the boiler wall 30.

The flow of the gas mixture into the inlet casting 3 may be adjusted by means of a valve 42 provided with channels 44 through which the gas may flow from a gas pipe or other source, not shown, into a chamber 40 where it is mixed with air entering in the direction of the arrow labelled "Air," preliminary to entering the inlet 3. The gas velocity may be controlled by adjusting, as by threading, the valve 42 in varying degrees within a threaded recess in a screw 36 having at its end an internal valve seat 46 for closing off the channels 44 of the valve 42. A nut 34 may be used to limit the degree of threading of the valve 42 within the seat 46. The screw 36, moreover, may be threaded in varying degrees within the upper or closed end of the chamber 40, a nut 38 limiting the amount of air that may be admitted into the chamber 40. As the screw 36 is thus threaded, the valve 42 and valve seat 46 are moved as a unit within the chamber 40, thus varying the air-gas mixture ratio.

Figure 5:
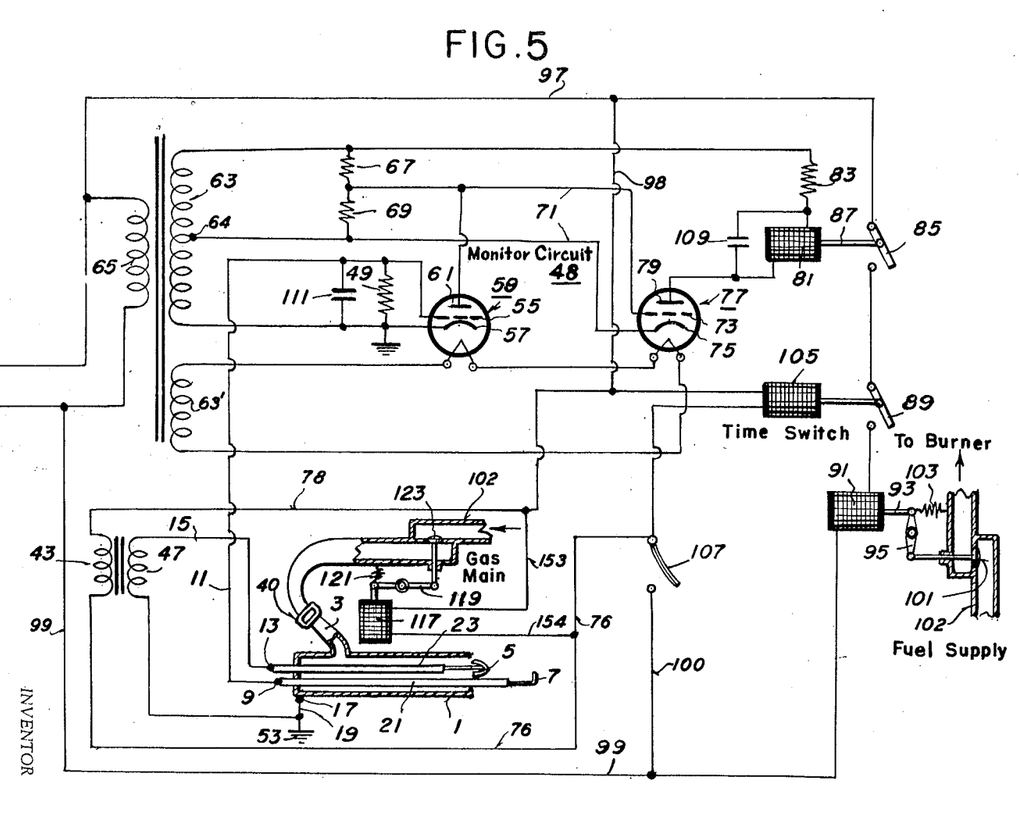
Fig. 5 is a schematic circuit diagram illustrating the operation of the device of Figs. 1 to 4 in a pilot-burner-main-burner system.
Figure 6:
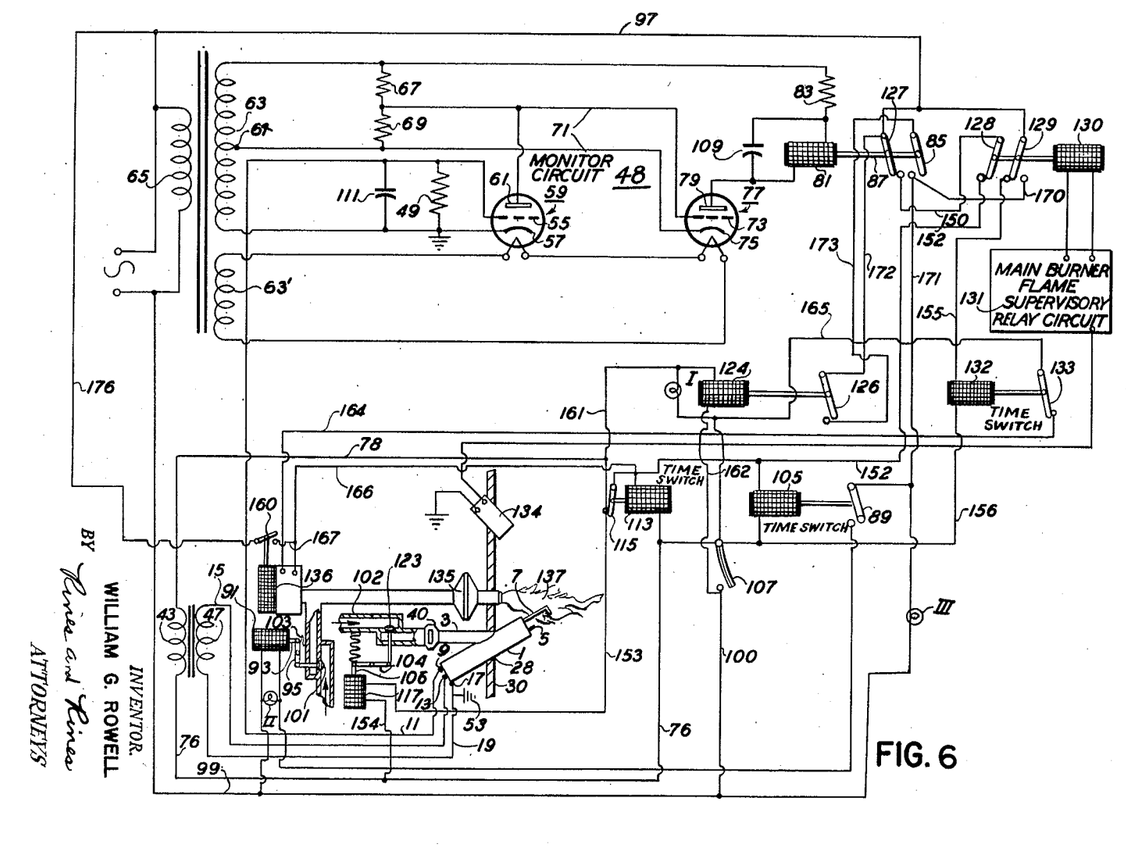
Fig. 6 is a similar diagram of a preferred modification.
Figure 8:
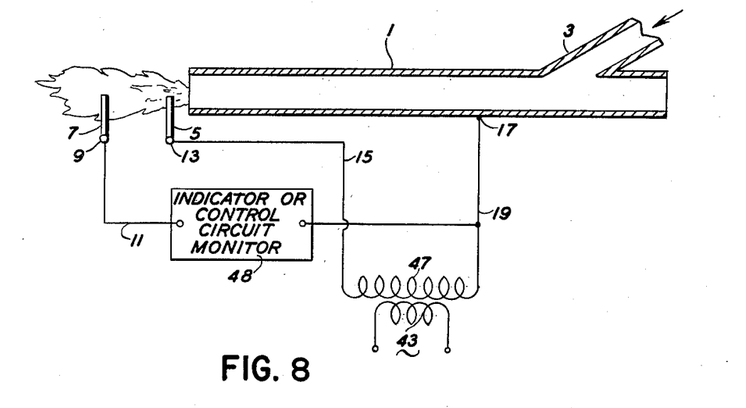

The pilot-burner construction of Figs. 1 to 4 is particularly adapted for use in the circuits of Figs. 5 and 6. In its simplest aspects, the general principle of the pilot flame-monitoring system of these circuits is illustrated in Fig. 8. Unlike the previously described prior-art systems, the high voltage established to ignite the gas mixture in the pilot burner tube 1 is also utilized simultaneously as the source of energy for operating the flame-probe monitoring circuit. Alternating-current mains voltage, for example, may be fed into a primary transformer winding 43 and stepping up in a secondary winding 47 to a much higher voltage, say of the order of 5000 volts. In Fig. 5, the winding 43 is shown energized from the mains by conductors 99, 100, through the device 107, when closed, and by conductors 76, 78, 98 and 97. One side or terminal of the secondary winding 47 is connected by the conductor 15 to the terminal 13 of the igniter electrode 5, shown schematically in Fig. 8 as a mere rod in the proximity of the open end of the burner, but shown, for example, in Fig. 5 as of the same preferred configuration of Figs. 1 to 4. The other side or terminal of the winding 47 is connected by conductor 19 to the terminal 17 of the burner tube 1. The gas mixture fed into the inlet 3 and through the tube 1, therefore, will be ignited in response to the arc effected by this high potential of the voltage source 47 in the electric circuit between the tube 1 and the igniter electrode 5, to produce a flame issuing from the open end or mouth of the burner tube 1, as shown. This same source of high-voltage potential 47 is also utilized, in accordance with the present invention, as the voltage for energizing the flame-monitoring circuit. This circuit is traceable from the one side of the transformer secondary 47 by conductor 15 to the terminal 13 of the igniter electrode 5, through the rectifying flame to the probe electrode 7, schematically illustrated as in rod form in Fig. 8, but shown in the preferred form of Figs. 1 to 4 in Figs. 5 and 6, thence to the terminal 9 of the probe electrode 7, and by way of conductor 11 through the monitoring apparatus comprising an indicator or control circuit 48, Fig. 8, to the other side of the transformer secondary winding 47. In Figs. 5 and 6, the indicator or control circuit is illustrated in detail, but this same circuit may be traced with the resistor 49 in the input circuit of the amplifier tube 59 considered as corresponding to the block 48 of Fig. 8. The rectified current in the flame-monitoring circuit of Figs. 5 and 6 flows from the probe electrode 7 through conductor 11, across the resistor 49 to ground. The circuit continues through ground to the ground connection 53 of the terminal 17 of the burner tube 1. The terminal 17 is connected to the opposite terminal of the winding 47 from which connection is made by conductor 15 to the igniter electrode 5.

The same high-voltage source 47 that energizes the igniter electrode 5 to produce the arc for igniting the gas in the normally ineffective pilot burner 1 thus also energizes the flame-monitoring circuit. If there is a flame between the igniter electrode 5 and the probe electrode 7, therefore, a flame-rectified voltage will be produced in the indicator or control circuit 48, Fig. 8, or across the resistor 49, Figs. 5 and 6. It will now be observed that should the pilot burner fail to operate, as, for example, when the igniter electrode 5 no longer is supplied with adequate voltage to produce ignition between itself and the tube 1, the flame-monitoring system of the present invention will indicate that no flame is present since the same source of energy 47 that is used to energize the igniter electrode 5, is used, also, as the source of energy in the flame-monitoring circuit. This would be true, moreover, unlike the before described prior-art systems, whether or not bricks in the furnace maintained spurious ignition of the pilot burner. In view of the fact, furthermore, that the ignition potential is of high value, say of the order of 5000 volts, very large flame-monitoring currents are available of the order of 400 microamperes, as compared with the few microamperes in present-day systems. The input circuit of the amplifier 59 may thus be a very low impedance circuit, the resistor 49 having a value, for example, of the order of a megohm. Should deposits of carbon and other products form on the probe electrode 7, therefore, they will not affect the operation of the system since there is plenty of current to spare. Since, furthermore, the present invention does not require the grounding of the flame, the before-mentioned erratic behavior of the prior-art systems is not herein produced and it is here immaterial whether or not the flame sputters away from the mouth of the tube 1. While prior-art systems are unable to differentiate between the main flame of the oil burner which might happen to impinge upon the probe electrode and the pilot flame, as before stated, in view of the fact that any flame that establishes a path between the flame probe and ground will produce an indication in such prior-art systems, the system of the present invention is completely unaffected by any portion of the main flame impinging on the probe electrode 7 since mere grounding does not complete a circuit, the ignition source 47 being required to operate and complete the pilot flame-monitoring circuit. Similarly, while a lazy yellow flame that has questionable ability to ignite the main oil burner may, if adequately grounded and in contact with the flame probe, be falsely indicative of proper operation in connection with the prior-art systems, unless a pilot flame of the desired sufficiently great heat characteristics is produced in the system of the present invention, the system can not function at all. This is again because of the use of the same high voltage source for producing the ignition of the pilot burner gas and for energizing the flame-monitoring circuit.

It is now in order to examine the details of the control or indicator circuits of Figs. 5 and 6. Referring, first, to Fig. 5, the resistor 49 in the low-impedance input circuit of the electron-discharge amplifier 59 is connected between the control-grid electrode 55 and the cathode 57 of the electron-discharge amplifier 59. A by-pass condenser 111 is connected in parallel with the resistor 49. Heater current for the cathode 57 of the amplifier 59 and for the cathode 75 of the hereinafter discussed amplifier 77 may be obtained from a heater secondary winding 63' of a transformer the primary 65 of which is energized by a source of alternating-current voltage, such as the mains. When a flame exists at the open end or mouth of the burner 1, the before-described flame-rectified voltage in the flame monitoring circuit will be developed across the resistor 49. A voltage may thus be applied to the control grid 55 negative with respect to the cathode 57, thereby to cut off or render non-conductive the normally conducting tube 59 when a flame exists. If, on the other hand, a flame does not exist, there can be no complete circuit from the igniter electrode 5 to the probe electrode 7, and no negative voltage will be applied to the grid 55 of the amplifier 59 to prevent the amplifier from conducting.

To the cathode 57 of the amplifier tube 59 is connected the lower terminal of a further secondary winding 63 that steps up the voltage from the primary winding 65. The upper terminal of the secondary winding 63 is connected to the plate 61 of the tube 59 through a resistor 67 forming part of a voltage-divider network 67, 69. The potential supplied by the winding 63 for placing the tube 59 in condition for operation, however, is of value small compared with the high arc-producing potential of the transformer 47. With the tube 59 normally non-conducting in the presence of a flame, as before explained, current can not flow from the junction of the voltage-divider resistors 67, 69 through the tube 59. There will be very little voltage drop, therefore, across the voltage divider resistor 69. Since this resistor 69 is connected by conductors 71 between the control grid 73 and the cathode 75 of the further vacuum-tube amplifier 77, the grid 73 will have essentially the same potential as the cathode 75 and the tube 77 will conduct, causing current to flow through a solenoid relay winding 81 in the circuit traceable from the cathode 75, through the tube 77 to its plate 79, through the relay winding 81, through the resistor 83 to the upper terminal of the secondary winding 63, through the winding 63 to the intermediate terminal 64 thereof, and by the lower conductor 71 back to the cathode 75. Under such circumstances, the energized relay 81 will pull in its armature 87, closing the switch 85. If desired, this switch may operate a pointer or some other indicator including a lamp, not shown, connected, as an example, in the same manner as the lamp 111 later discussed in connection with Fig. 6, thereby to indicate proper operation of the flame of the pilot burner. The solenoid winding 81 is shown shunted by a by-pass condenser 109. Assuming, for the moment, that a further switch 89 is also closed, this will result in energizing a further solenoid winding 91 with energy from the mains by way of conductors 97 and 99 through the closed switches 85 and 89. The armature 93 of the solenoid winding 91 will then become pulled into the winding, pivoting the lever 95 counterclockwise and thereby pushing outward, to the right, on the valve plunger 101. This renders the normally ineffective fuel-oil supplying system effective to feed oil to the burner gun at the time that the pilot burner flame is being produced.

If, on the other hand, there is no pilot flame, there is no current in the monitoring circuit between the igniter electrode 5 and the probe electrode 7, and the amplifier tube 59 conducts, as before stated. This conduction will produce a negative bias voltage across the resistor 69 that renders the grid 73 of the amplifier 77 negative with respect to its cathode 75 and thus cuts off the tube 77. The relay 81 will then become de-energized so that the switch 85 returns, as under the action of a restoring spring, not shown, similar to the hereinafter described spring 103, to the open position shown in Fig. 5. Current can no longer, therefore, flow in the solenoid-winding 91, and the arm 95 will be returned by the spring 103 to the position shown in Fig. 5, drawing the valve plunger 101 back to the illustrated closed position, rendering ineffective the oil-supply system and preventing oil from reaching the main burner.

The switch 89 may be controlled by still a further solenoid winding 105 that may be energized, also, by the energy of the mains through conductors 97, 98, 99 and 100 when a thermostat, aquastat, pressurestat or any other type of control device 107 is closed. The solenoid 105 may serve as a safety time switch or time delay for delaying the closing of the switch 89, thereby to delay the energization of the relay 91 for any particular desired interval of time, depending upon the time of operation of the device 107 and of the solenoid 105.

Control over the supply of gas to the pilot burner is effected by still another solenoid relay 117. The solenoid 117 is energized in parallel with the relay 105 by conductors 153 and 154, causing the pivoting of an arm 119 counterclockwise, in opposition to the action of the spring 121, thus to control the valve 123, regulating the flow of gas reaching the inlet 3 of the pilot burner. In order to illustrate that the gas may be passed into the burner 1 in any desired way, the inlet 3 is shown in Fig. 5 entering the opposite side of the burner 1 from the side shown in Figs. 1 to 4.

The monitor circuit and gas pilot torch or burner of Fig. 5 may readily be applied as a modification to present-day programming and flame-supervising equipment merely by inserting the pilot burner within a wall of the main burner and effecting a few electrical connections from the monitor circuit of Fig. 5 to existing external terminals of present-day control equipment. A more complete circuit illustrating the application and connection of the system of Fig. 5 to such programming and flame-supervising equipment is shown in Fig. 6.

Figure 9:
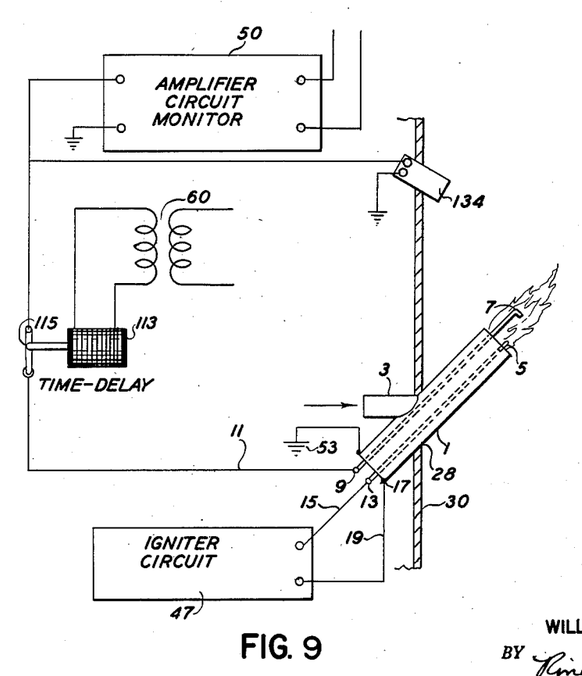

The preferred circuit of Fig. 6 is very similar to that described in connection with Fig. 5, providing, however, further refinements including provision for automatically rendering the pilot burner flame-monitoring circuit inoperative after the elapse of a period of time in which main burner fuel should, in the normal course of events, have been ignited. The general principal of this feature is illustrated in Fig. 9 for purposes of simplicity of explanation and in order to demonstrate that this particular feature may be employed with other types of igniter systems, probe detecting systems and monitoring or control systems than those of the present invention, though it is of particular utility therewith. Thus in Fig. 9, a generalized igniter circuit is illustrated at 47 for rendering the normally ineffective pilot burner effective to produce the pilot burner flame. Any desired voltage source, not shown, may energize the pilot flame monitoring circuit. A conventional main burner monitor photoelectric-cell, microphone or other pick-up device 134 is shown connected to any desired amplifier circuit 50 to which, also, the pilot burner flame-monitoring circuit may be connected, as with the before-mentioned present-day systems, if it is not desired to employ the other features of the present invention. After the pilot burner flame has been proved to exist and the main burner fuel has been supplied for a period of time in which the fuel should be ignited, in accordance with this feature of the invention, a time-delay solenoid or other device 113, energized by a transformer 60, will cause a normally closed switch 115 to open, disconnecting the pilot-flame monitoring circuit from the amplifier circuit 50. Thus the danger of the pilot-flame monitoring circuit producing an indication in the amplifier circuit 50 that would produce the same results as if the main flame monitoring device 134 were indicating a proper main flame, even though the main flame monitoring device were inoperative, is obviated.

Figure 10:
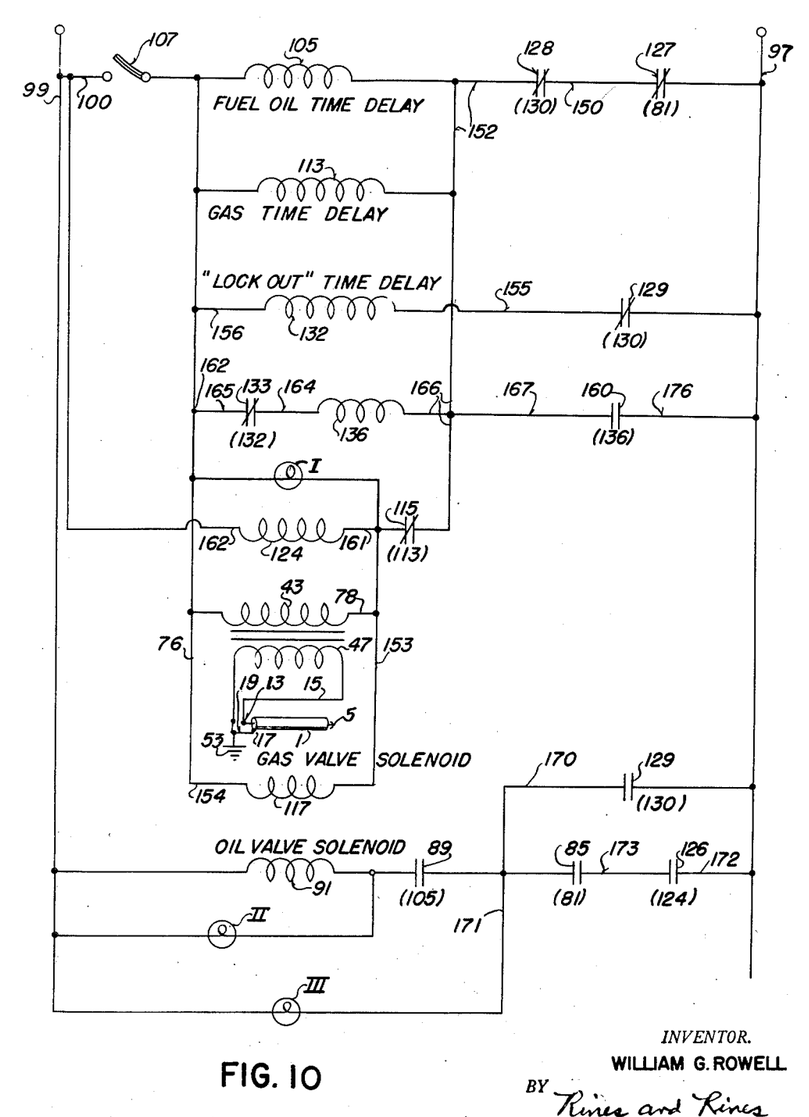
Fig. 10 is an across-the-line explanatory circuit diagram of the system of Fig. 6.

The application of this feature to the particular preferred circuit of Fig. 6 is also effected through the use of the time-delay solenoid 113 and its armature-operated normally closed switch 115, as later described. It will be conducive to clarity to describe the circuit of Fig. 6 in connection with the successive steps of operation thereof, pointing out the details of Fig. 6 lacking from the circuit of Fig. 5. A simplified across-the-line diagram of the circuit of Fig. 6 is presented in Fig. 10 further to aid in tracing the circuit.

First, the control switch 107 is closed. While this switch is shown operating on full mains voltage, it may be operated in a low-voltage circuit, as is well known. The solenoid gas-valve-controlling relay 117 is energized with alternating current from the mains in the circuit traceable from the top side of the mains (shown at the right-hand side in Fig. 10), by conductor 97 through a switch 127 carried on the same armature 87 as the switch 85 of the solenoid relay 81, described in connection with Fig. 5; along a conductor 150 and through a switch 128 thus connected in series with the switch 127 and carried upon the armature of a further solenoid relay 130; along conductor 152 through the switch 115 of the solenoid 113, simultaneously energizing the same, and by conductor 153 to the upper terminal of the gas-valve-controlling relay 117; through the relay 117 to its lower terminal and by conductor 154 to conductor 76; thence, through the closed control switch 107 and by conductors 100 and 99 to the other side of the mains. Not only are the gas-valve-controlling relay 117 and the time-delay relay 113 energized at this time, but the transformer primary winding 43 supplying the ignition and flame-monitor circuit driving voltage in the secondary 47 is also energized. This is because the top terminal thereof (right-hand terminal in Fig. 10) is connected by conductors 78 and 153 to the top terminal of the solenoid 117 (right-hand terminal in Fig. 10), and the bottom terminal of the transformer primary winding 43 (left-hand terminal, Fig. 10) is connected by conductors 76 and 154 to the bottom terminal of the solenoid 117 (the left-hand terminal in Fig. 10), so that the solenoid 117 and the primary winding 43 are connected in parallel. Also energized at this time are the time-delay solenoid relay 105, connected between the conductor 152 and the control switch 107, and still a further solenoid relay 132. The latter is energized from the mains in the circuit including the conductor 97, a switch 129 carried on the same armature of the solenoid relay 130 as the before-mentioned switch 128, conductor 155, conductor 156, the switch 107 and conductors 100 and 99. Still a further solenoid 124 is likewise normally energized by virtue of its connection on one side by conductor 161 and the contactor 115 of relay 113 to conductors 166 and 167, and through contactor 160 to the conductor 97; and, on the other side, by conductor 162 to conductors 100 and 99. The purpose of this relay 124 will later be explained. An indicator lamp I, such as an NE51-type two-electrode neon tube, shunted across the relay 124, will then illuminate, indicating both opening of the pilot-burner gas valve 123 for feeding gas to burner 1 and the ignition of the gas.

The primary result of this first operational step is to ignite the pilot burner by the voltage from the secondary 47 between the igniter electrode 5 and the burner 1, producing by means of the flame-probe detecting circuit 7, 9, 11–19, 17, 53, a monitoring voltage across the resistor 49, cutting off the normally conducting tube 59, as described in connection with Fig. 5. As before explained, this causes conduction of the tube 77, operating the solenoid winding 81 and closing the switch 85. In so closing the switch 85, the armature of the solenoid 81 opens the previously mentioned switch 127 from its contact position with the conductor 150. As will later be shown, however, a shunt path from the switch 127 to the conductor 152 is established by a switch 160 so that the energizing circuit is not actually broken.

By this time, the time-delay mechanism of solenoid relay 105 has been set into operation, closing the switch 89 and energizing the main burner fuel oil supply solenoid 91 for controlling the fuel valve 101, discussed in connection with Fig. 5. A second indicator lamp II shunted across the solenoid 91 thus illuminates, indicating that the fuel oil valve has been energized. Fuel thus flows into the main burner gun 135. A blower and burner-motor starting relay the winding of which is shown at 136, is connected in parallel with the relay 105 through conductor 164, switch 133, conductor 165 and conductor 162, to the bottom terminal of the solenoid 105 (left-hand in Fig. 10), and through conductor 166 to the top terminal thereof (right-hand in Fig. 10), being thus set into operation. Such energization of the burner-motor starting-relay winding 136 may act to close the switch 160, providing the before-mentioned shunt across the contacts of series-connected switches 127 and 128. The path of this shunt circuit may be traced from the left-hand terminal of switch 160, Fig. 6, by conductors 176 and 97 to the upper contact of switch 127, and by conductors 167, 166 and 152 to the lower terminal of the switch 128. Even if these switches open, therefore, energy will still be continuously supplied through this shunt path to relays 105, 113, 132 and 136.

A photocell, microphone or other main flame-responsive pick-up device 134 may monitor the existence of the main burner combustion, producing an indication in any well-known main-burner flame-supervisory relay circuit 131 that energizes the solenoid relay 130. Such energization causes the pulling in of the relay armature, opening switch 128 and closing switch 129. The switch 85 actuated to its closed position by the operation of the pilot burner and the resulting conduction of the amplifier 77, is then connected in series with the closed switch 129 through the conductor 170. Current thus flows from conductor 97, through closed switch 129 and conductor 170, and by way of conductor 171 to a third indicator lamp III that connects with the conductor 99. The illumination of the lamp III can thus indicate three conditions. During ignition of the pilot burner it indicates that the pilot flame is proper in the circuit traceable from the conductor 97 along conductor 172, through switch 126 and along conductor 173, thence through closed switch 85 and conductor 171 through the lamp III to the conductor 99. The lamp III, when illuminated, indicates, further, the proper operation of the main burner flame in the above-traced circuit comprising the closed switch 129 and conductors 170 and 171. Thirdly, illumination of the lamp III when the main burner is not going, will indicate a component failure, such as, for example, a failure of the tubes 59 or 77, which might cause the relay 81 to be falsely operated. This is because the energized relay 124 will permit the contactor 85 of the relay 81 to be connected through contactor 126 to the conductor 97, that may be grounded, thus connecting the lamp III between the conductor 97 and the conductor 99, across the mains.

False operation of the relay 81 during operating periods of the main burner, on the other hand, would normally permit the continued energization of the main burner fuel-valve-controlling relay 91 were it not for the presence of the before-mentioned relay 124. If, in present-day systems, the flame supervisory relay, corresponding to the relays 81 and 130, which control both the pilot and main flame, is falsely operated, the main burner continues to run and fuel is pumped into the firebox thereof until a last resort switch, called a limit switch, finally shuts down the main burner, upon the attainment of a predetermined pressure or temperature. Assuming that a combustion failure takes place during the period that the supervisory relay is falsely operated, nothing will shut down the present-day main burner, and if the fuel stoppage that caused the combustion loss should be resumed, unignited fuel will be pumped into the firebox continuously. If relay 130 of present-day systems operates falsely, and a combustion failure follows, nothing will shut off the main burner fuel supply. This condition is inherent with present-day devices and is acceptable to safety authorities only because no remedy has heretofore been available. With the aid of the relay 124 of the present invention, on the other hand, an additional fail-safe feature presently unobtainable is provided. This results from the de-energization of the relay 124 after the time switch 113 has opened at a time when the ignition of the main burner fuel should have been accomplished, thereby disconnecting contactor 85 from the conductor 97, which may, as before stated, be grounded. The main burner fuel-valve-controlling relay 91 is thus disconnected from the side of the mains connected to conductor 97 and is prevented from being held energized after the ignition period of the main burner in the event of a component failure in the flame monitor circuit. Additional safety is thus available with the present invention. It may be observed, moreover, that in the unlikely event that both the ignition system and gas valve were both falsely in operation after the ignition period should have occurred, the de-energization of the relay 124 will prevent the monitor circuit from interfering with the main-flame supervisory equipment.

The time-delay solenoid 113 will operate, meanwhile, after a predetermined time during which the fuel of the main burner should normally have been ignited, usually of the order of twenty seconds. The switch 115 thus opens, breaking circuit with the primary winding 43, and not only cutting off pilot ignition which should no longer be needed, but, as in the case of Fig. 9, rendering impossible pilot-burner probe-monitoring indications. The amplifier tube 59 will thus again conduct, cutting off amplifier 77 and de-energizing the solenoid 81 so that the switch 85 returns to its shown open position. Thus the pilot-flame monitoring circuit is responsive to the pilot burner flame only during the periods that its operation is actually demanded. The main burner fuel oil solenoid 91, however, continues to be energized as a result of the previously described operation of the solenoid 130, holding the switch 129 closed. If main burner combustion is lost, however, relay 130 releases, causing the solenoid 91 to de-energize and closing off the fuel valve 101. After a short time, allowed for removing gases from the boiler, the time-delay operation of relay 132 will then take effect opening the switch 133 and deenergizing the burner-motor starting-relay winding 136. The burner is now "locked out" in a safety position. To restart, the burner control switch 107 must thus be held open until the time delay relays reset.

The above-described circuits and mechanical constructions, as illustrated in Figs. 5 and 6, can be readily applied in substitution for existing monitoring and control circuits in present-day apparatus without difficulty. It is to be understood that while the above-described circuits are preferred and have been found to work most satisfactorily in practice, many modifications therein may be effected. Other types of well-known time-delay systems and switches and other types of discharge devices than the electron-tube amplifiers, such as gaseous-discharge devices of the thyratron type, may be utilized. In order to assist in following the programmed operation of the circuit, moreover, the indicator lamps I, II and III may be covered with, for example, amber, white and red, or any other colored, windows or transparent coverings. In place of lamps, of course, metering and voltage-responsive indicating, measuring or recording devices could be employed. Instead of using the preferred normally conductive amplifier 59, moreover, a normally non-conductive amplifier circuit may be employed, triggered by a positive flame-probe voltage to effect similar results. Other modifications also immediately suggest themselves to those skilled in the art.

Figure 1:
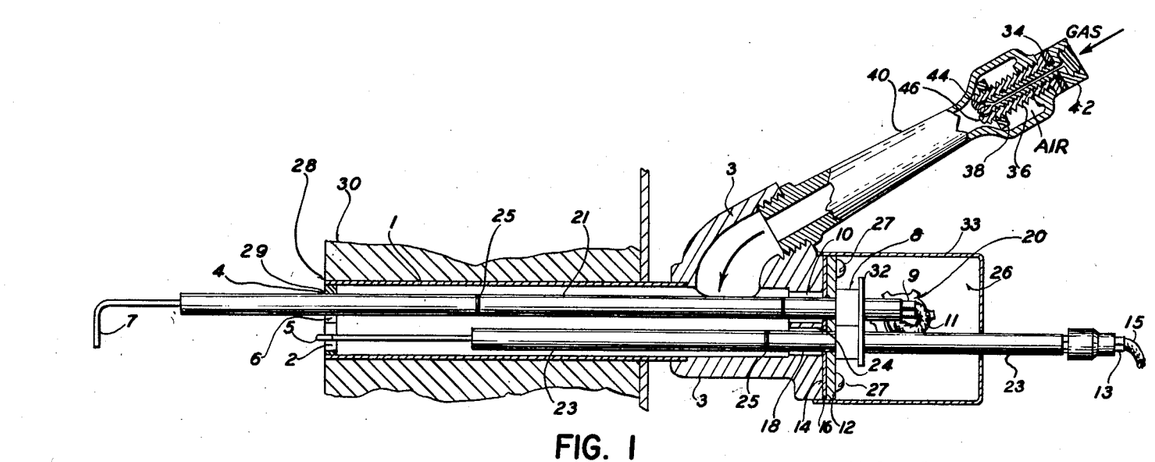
Figure 2:
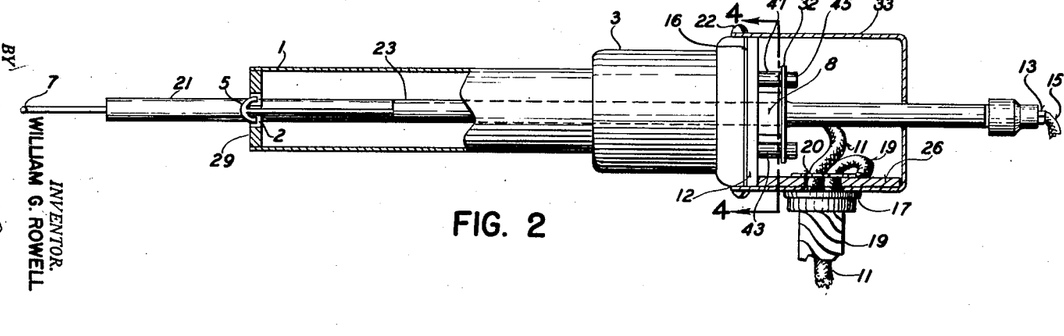
Fig. 2 is a plan view of the same, partly broken away to show details of construction.
Figure 3:
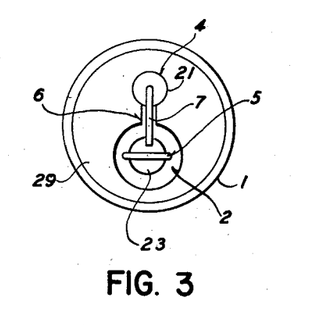
Fig. 3 is an end view of the same.
Figure 4:
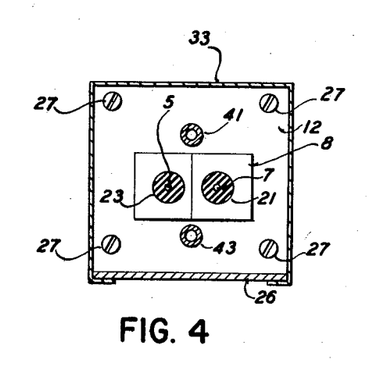
Fig. 4 is a section taken along the line 4—4 of Fig. 2, looking in the direction of the arrows.
Figure 7:
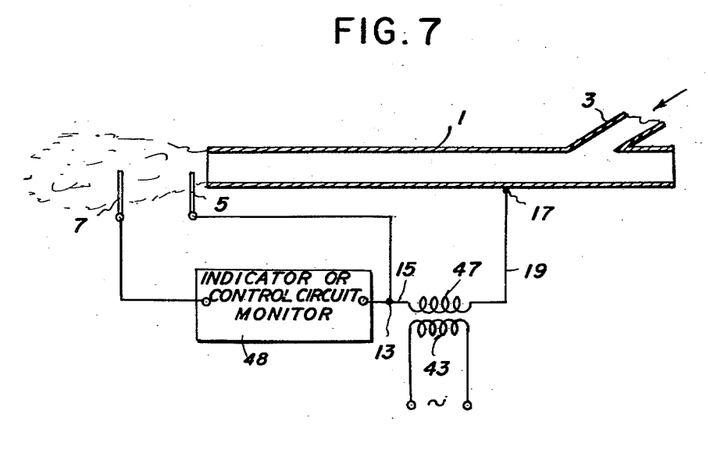
Figs. 7 to 9 are schematic diagrams of still further modifications.

Returning, now, to the details of the preferred type of pilot-burner flame-monitoring system of the present invention, while this system has been described in connection with the igniter electrode 5 positioned just at the mouth of the burner tube 1, it is to be understood that the igniter electrode 5 may also be positioned inside the burner 1 or outside the mouth thereof, as shown in Figs. 1 and 7, and that other forms of igniter electrodes may be used such as the probe 5 of Fig. 7 or a pair of discharge probes. In the modification of Fig. 7, the high-voltage secondary winding 47 supplies its voltage between the igniter electrode 5 and the burner 1 in parallel with supplying voltage to the probe-monitoring circuit between the probe 7 and the tube 1. Problems attendant upon present-day attempts to ground the flame do not arise here in view of the high voltage utilized to energize the flame-monitoring circuit.

While the before-described mechanical constructions and circuits have particular application to pilot-gas burners and to main fuel-oil burners, it is to be understood that the ignition-and-monitoring apparatus and other features of the present invention may be used elsewhere, also, with other types of burners and with other types of control or indicator circuits. The main burner, as an illustration, may utilize pulverized coal or gas.

Figure 11:
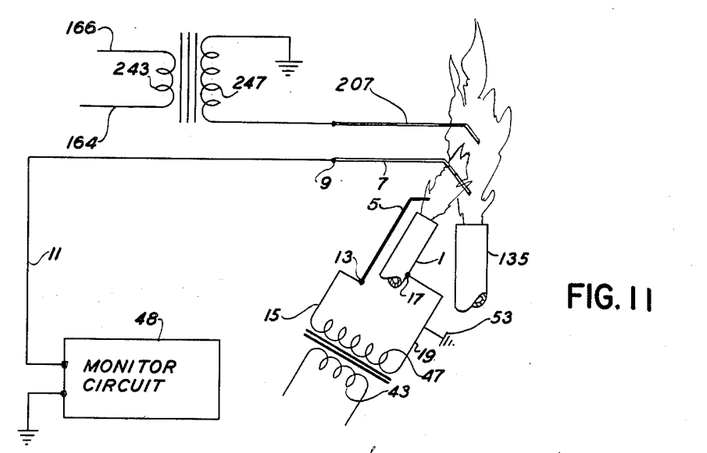
Figs. 11 to 13 are partial schematic diagrams of further modifications.

In the event that it is desired to substitute for the photocell or other main-flame monitor pick-up device 134 a main flame probe electrode, this may be effected as shown in Fig. 11. The pilot flame probe electrode 7 is schematically shown disposed outside the burner tube 1, as in Figs. 7 and 8, though it may be supported within the tube, as in Figs. 5 and 6, but it preferably extends to a region where it may also be intercepted by the flame of the main burner 135. The same monitor circuit 48 of Figs. 5 and 6, with all of the relays, time-delays and other programming features thereof may be utilized. In place of the photocell or other device 134, however, there is substituted a further flame probe electrode 207 extending into the main flame of the main burner 135 in a region displaced from the region of intersection of the main and pilot flame at which the pilot-flame probe electrode 7 is disposed. When the pilot flame has been monitored and the main burner flame should have, in normal operation, been produced, as before described, the pilot burner is rendered inoperative and the main burner flame must thereafter be monitored. This is effected in Fig. 11 with the aid of a further voltage source shown as an alternating-current transformer, the primary winding 243 of which may be connected to the main burner motor-energizing conductors 164 and 166 of Fig. 6, and the secondary winding 247 of which is grounded at one terminal and connected to the main-burner flame probe 207 at its other terminal. The main flame will thus be monitored by the passage of current from the secondary winding 247, between the probe electrodes 207 and 7 in the rectifying main flame, and by conductor 11 and ground to the input terminals of the monitor circuit 48. Loss of the main flame will prevent the passage of current from the electrode 207 to the electrode 7 so that an indication thereof is produced just as an indication is produced by the loss of current in the photocell 134 of Fig. 6 when the main flame fails.

Figure 12:
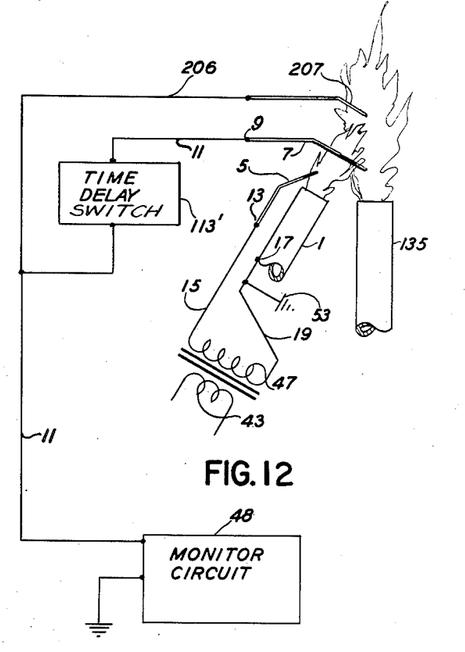

If the pilot burner 1 is to be provided with a constant ignition potential, instead of the intermittent ignition potential of Figs. 5, 6 and 11, a time-delay means such as a time-controlled switch 113' may be inserted in the connection 11 from the probe electrode 7 to the monitor circuit 48, as shown in Fig. 12, to prevent monitoring of the pilot-burner flame after the main flame should have been produced. The main flame probe electrode 207 is then connected by a conductor 206 to the conductor 11, utilizing the potential of the ignition supply transformer secondary winding 47 to produce a main-flame monitoring circuit from the continuously arcing igniter electrode 5, through the continuously produced pilot-burner flame, the main flame, the electrode 207, conductors 206, 11 and ground. With such a system, the loss of either the pilot flame or the main flame, or both can be indicated.

Figure 13:
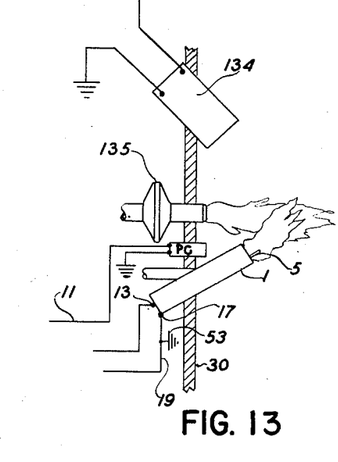

Some of the previously described safety features of the present invention, such as those associated with the relay 124 may, of course, be incorporated with other types of pilot-flame detectors than probe electrodes. In the system of Fig. 13, for example, the exact same circuit of Fig. 6 may be utilized, connected to the indicated conductors, with a photocell PC, such as of the lead sulfide infra-red-ray-sensitive type, connected as by ground and by the conductor 11 across the input resistor 49 of the monitor circuit 48.

Further modifications will occur to those skilled in the art, and all such are considered to fall within the spirit and scope of the present invention as defined in the appended claims.

What is claimed is:

1. Apparatus of the character described comprising a longitudinal tubular chamber having at one end a plate provided with interconnected apertures and a detachable cover at the other end, a fuel inlet communicating with the interior of the chamber at a region intermediate its ends and into which gas may be fed and mixed with air, insulation-covered igniter and flame-monitoring electrodes extending longitudinally through the interior of the chamber and each passing through and supported by the cover, the electrodes being provided with electric terminals at their ends beyond the cover, the igniter electrode having a U-shaped conducting transverse portion at its other end disposed with the arms of the U adjacent one of the apertures in the end plate, and the flame-monitoring electrode extending through and closely fitting within another aperture in the said end plate terminating in a conducting transverse portion at its other end in the space outside the said one end of the chamber, the dimensions of the transverse end portions of the igniter and flame-monitoring electrodes being less than a dimension of the said interconnected apertures in the end plate.

2. A flame sensing system having, in combination, a burner adapted to burn a combustible mixture of fuel and air, means for supplying the fuel to the burner, a pair of fixed igniting electrode means defining a fixed spark gap disposed in the path of the mixture of fuel and air, an alternating-current voltage source having its terminals respectively connected to the igniting electrode means and having a predetermined potential sufficient to produce and maintain an electrical arc continually across the said fixed gap, thereby to ignite the said mixture and produce a flame that extends along a predetermined path away from the burner, flame electrode means positioned downstream from said igniting electrode means in the path of the flame at a point remote from the said arc and the said burner, flame-monitoring apparatus for monitoring only direct-current signals, means for supplying to the monitoring apparatus to place the same in condition for operation a potential of value small compared with the said predetermined electrical-arc-producing potential, and an electrical flame-monitoring circuit for the transmission of flame-monitoring direct-current signals comprising the flame electrode means, the flame-monitoring apparatus, the electric arc-producing alternating-current voltage source, one of the igniting electrode means, and the rectifying portion of the flame between the said one igniting electrode means and the flame electrode means, whereby flame failure is indicated by said monitoring apparatus upon loss of transmission of the said flame-monitoring direct current through the said circuit.

3. A flame sensing system as claimed in claim 2 and in which there is provided fuel-valving means for controlling the fuel-supplying means, and means for connecting the flame-monitoring apparatus to the fuel-valving means to maintain the same in an open position during the transmission of the said flame-monitoring current through the said circuit and in a closed position upon the loss of transmission of the said flame-monitoring current through the said circuit.

References Cited in the file of this patent
UNITED STATES PATENTS

| | | |
|---|---|---|
| 1,688,126 | Metcalfe | Oct. 16, 1928 |
| 2,136,256 | Sweet | Nov. 8, 1938 |
| 2,238,892 | Fanger | Apr. 22, 1941 |
| 2,285,326 | Bergthold | June 2, 1941 |
| 2,304,200 | Plein et al. | Dec. 8, 1942 |
| 2,313,943 | Jones | Mar. 16, 1943 |
| 2,402,763 | Longini | June 25, 1946 |
| 2,427,178 | Aubert | Sept. 9, 1947 |
| 2,537,293 | Peterson | Jan. 9, 1951 |
| 2,577,772 | Kennedy | Dec. 11, 1951 |
| 2,594,059 | Nagel | Apr. 22, 1952 |
| 2,608,245 | Clark | Aug. 26, 1952 |
| 2,616,490 | Wilson et al. | Nov. 4, 1952 |
| 2,627,308 | Clark | Feb. 3, 1953 |
| 2,665,749 | Ebeltoft | Jan. 12, 1954 |
| 2,727,568 | Smith | Dec. 20, 1955 |